United States Patent
Rudrabhatla et al.

(10) Patent No.: US 10,943,016 B2
(45) Date of Patent: Mar. 9, 2021

(54) SYSTEM AND METHOD FOR MANAGING DATA INCLUDING IDENTIFYING A DATA PROTECTION POOL BASED ON A DATA CLASSIFICATION ANALYSIS

(71) Applicant: EMC IP Holding Company LLC, Hopkinton, MA (US)

(72) Inventors: Anand Rudrabhatla, Pleasanton, CA (US); Peter Marelas, Donvale (AU)

(73) Assignee: EMC IP Holding Company LLC, Hopkinton, MA (US)

( * ) Notice: Subject to any disclaimer, the term of this patent is extended or adjusted under 35 U.S.C. 154(b) by 181 days.

(21) Appl. No.: 16/177,230

(22) Filed: Oct. 31, 2018

(65) Prior Publication Data

US 2020/0134198 A1 Apr. 30, 2020

(51) Int. Cl.
- *G06F 21/60* (2013.01)
- *G06F 3/06* (2006.01)
- *G06K 9/62* (2006.01)

(52) U.S. Cl.
CPC .............. *G06F 21/60* (2013.01); *G06F 3/067* (2013.01); *G06F 3/0623* (2013.01); *G06F 3/0631* (2013.01); *G06K 9/6267* (2013.01)

(58) Field of Classification Search
CPC ...... G06F 21/60; G06F 3/0623; G06F 3/0631; G06F 3/067; G06F 3/0637; G06F 3/0644; G06F 3/0647; G06F 12/00; G06F 13/00; G06K 9/6267

See application file for complete search history.

(56) References Cited

U.S. PATENT DOCUMENTS

| | | | |
|---|---|---|---|
| 9,519,595 B1 * | 12/2016 | Zeldin | G06F 3/0605 |
| 2004/0199566 A1 | 10/2004 | Carlson | |
| 2010/0169570 A1 | 7/2010 | Mesnier | |
| 2016/0011815 A1 | 1/2016 | Klein | |
| 2016/0216909 A1 * | 7/2016 | Provenzano | G06F 3/0641 |
| 2017/0262185 A1 | 9/2017 | Long | |
| 2019/0303608 A1 * | 10/2019 | Cohen | G06F 3/067 |
| 2020/0042636 A1 * | 2/2020 | Routray | G06F 16/35 |

FOREIGN PATENT DOCUMENTS

GB 2517688 A 3/2015

OTHER PUBLICATIONS

Extended European Search Report issued in corresponding Application No. 19201436,.3, dated Mar. 27, 2020 (10 pages).

* cited by examiner

*Primary Examiner* — Tuan V Thai
(74) *Attorney, Agent, or Firm* — Chamberlain, Hrdlicka, White, Williams & Aughtry (57) ABSTRACT

A system and method for managing data includes identifying, in response to a storage request from a tenant system, a first data protection pool based on a data classification analysis performed on data associated with the storage request and initiating storage of data associated with the storage request in a first storage system associated with the first data protection pool. A pattern matching model and data sampled from the tenant system may be used to identify data characteristics, which may include data type, data retention, data sensitivity, and data location. At least some data characteristics may be obtained using a plugin to a tenant system on which the data associated with the storage request is stored.

20 Claims, 9 Drawing Sheets

SYSTEM AND METHOD FOR MANAGING DATA INCLUDING IDENTIFYING A DATA PROTECTION POOL BASED ON A DATA CLASSIFICATION ANALYSIS

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing, storage, and network bandwidth. The utilization of the aforementioned computing resources to generate backups may impact the overall performance of the computing resources.

SUMMARY

In one aspect, a method for managing data in accordance with one or more embodiments of the invention includes identifying, in response to a storage request from a tenant system, a first data protection pool based on a data classification analysis and initiating storage of data associated with the storage request in a first storage system associated with the first data protection pool.

In another aspect, a system for managing data in accordance with one or more embodiments of the invention includes a processor and memory comprising instructions, which when executed by the processor perform a method. The method includes identifying, in response to a storage request, a first data protection pool based on a data classification analysis and initiating storage of data associated with the storage request in a first storage system associated with the first data protection pool.

In yet another aspect, non-transitory computer readable medium in accordance with one or more embodiments of the invention includes computer readable program code, which when executed by a computer processor enables the computer processor to perform a method for managing data. The method includes identifying, in response to a storage request from a tenant system, a first data protection pool based on a data classification analysis and initiating storage of data associated with the storage request in a first storage system associated with the first data protection pool.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those of ordinary skill in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for providing storage services in a distributed environment. More specifically, embodiments of the invention relate to methods and systems for determining a data protection pool in which to store data requested by tenants Data classification may be performed, e.g., using machine learning and pattern recognition rules, on the data in order to determine the appropriate data protection pool in which to store the data.

Further, embodiments of the invention are directed to methods for monitoring data stored in storage systems (which are part of the data protection pools) and, based on the monitoring, migrate the data from a storage system in one data protection pool to a storage system in another data protection pool.

Figure 1A:
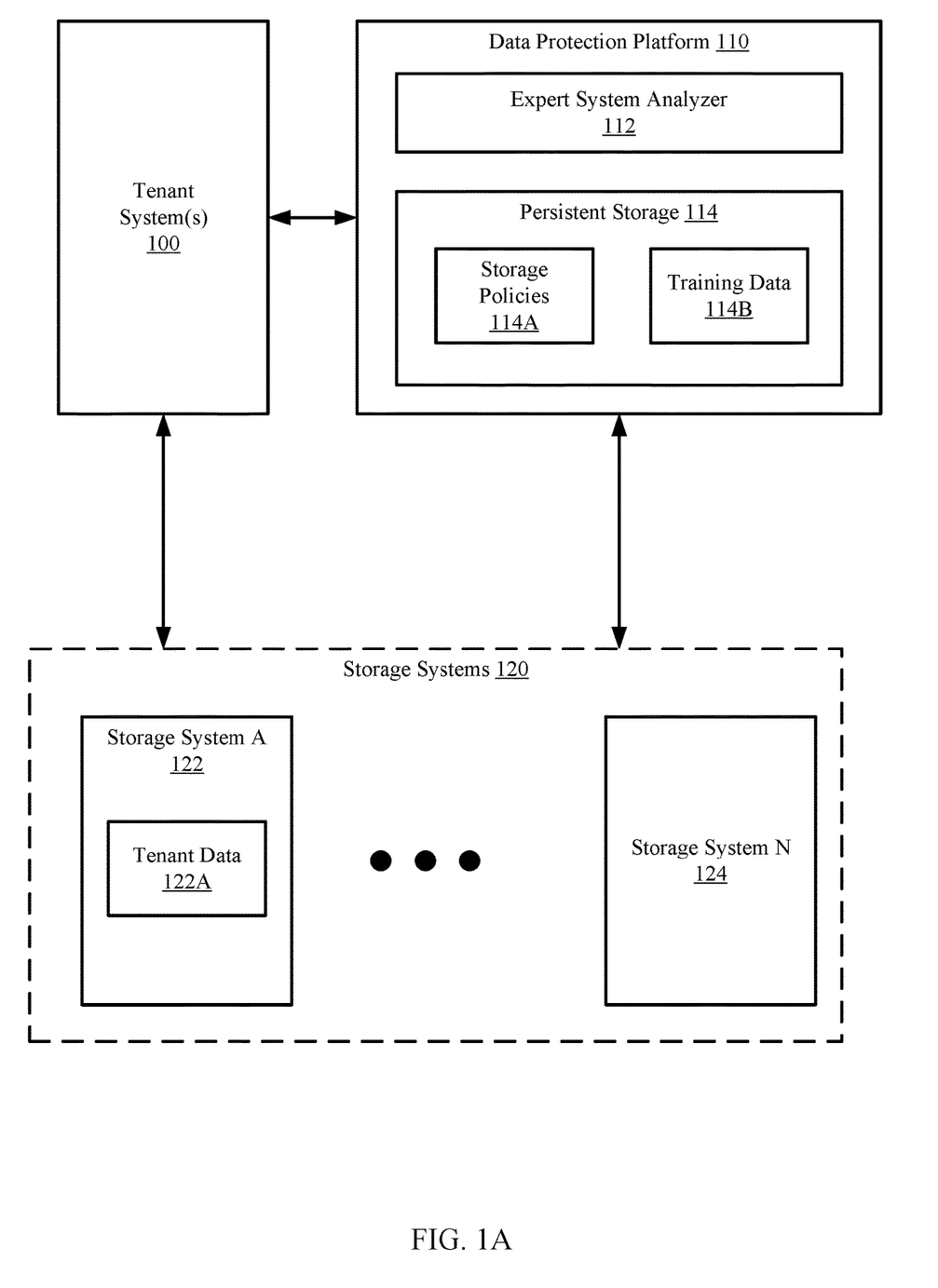
FIG. 1A shows a diagram of a system including a data protection platform in accordance with one or more embodiments of the invention.

FIG. 1A shows an example system in accordance with one or more embodiments of the invention. The system includes one or more tenant systems (100), a data protection platform (110) and one or more storage systems (120). Each component of the system of FIG. 1A may be operably connected via any combination of wired and/or wireless connections. Each component of the system is discussed below.

In one or more embodiments of the invention, each tenant system (100) includes one or more computing devices that store data for a tenant (e.g., an individual, corporation, partnership, or any other legal entity) and/or request tenant data to be stored in the storage systems (120) or in a data protection pool (not shown). Each computing device operated in a tenant system (100) may be operably connected via any combination of wired and/or wireless connections. A computing device in a tenant system (100) may interact with the data protection platform (110) to facilitate the storage of tenant data in the storage systems (120).

In one or more embodiments of the invention, computing devices in the tenant systems (100) may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the tenant system(s) (100) described throughout this application. Additional detail about the computing devices in provided in FIG. 4.

In one or more embodiments of the invention, the tenant system(s) (100) are implemented as a logical device. The logical device may utilize the computing resources of any number of computing devices and thereby provide the functionality of the tenant system(s) (100) described throughout this application.

In one or more embodiments of the invention, the data protection platform (110) processes data and/or orchestrates the storage of data in the storage systems (120). To perform the aforementioned functionality, the data protection platform (110) may include an expert system analyzer (112) and persistent storage (114) as shown in FIG. 1A. The data protection platform (110) may include additional, fewer, and/or different components without departing from the invention.

In one or more embodiments of the invention, the data protection platform (110) processes storage requests to store data, discovers (and/or determines) data characteristics of the data, and determines where to store the data in the storage systems (120) (i.e., the data protection pool in which to store the data). More specifically, the expert storage system (112) may determine how to store the data by selecting a data protection pool in which to store the data based on storage policies (114A) (defined below) and/or training data (114B) (defined below). The expert system analyzer (112) may use the storage policies (114A) to determine a data protection pool in which to store data requested by a tenant based on previously established rules. Further, the expert system analyzer (112) may analyze the data (i.e., the data that is to be stored in a data protection pool) to classify the data and determine an optimal data protection pool based on the classification of the data. In one embodiment of the invention, the data protection platform (110) includes functionality to process storage requests and determine a data protection pool in which to store the data in accordance with FIGS. 2A-2B. The data protection platform (110) also includes functionality to monitor data that is stored in the data protection pools and, based on the monitoring, migrate data from one data protection pool to another. The aforementioned functionality may be implemented by the data protection platform (110) in accordance with FIG. 2C.

Figure 2A:
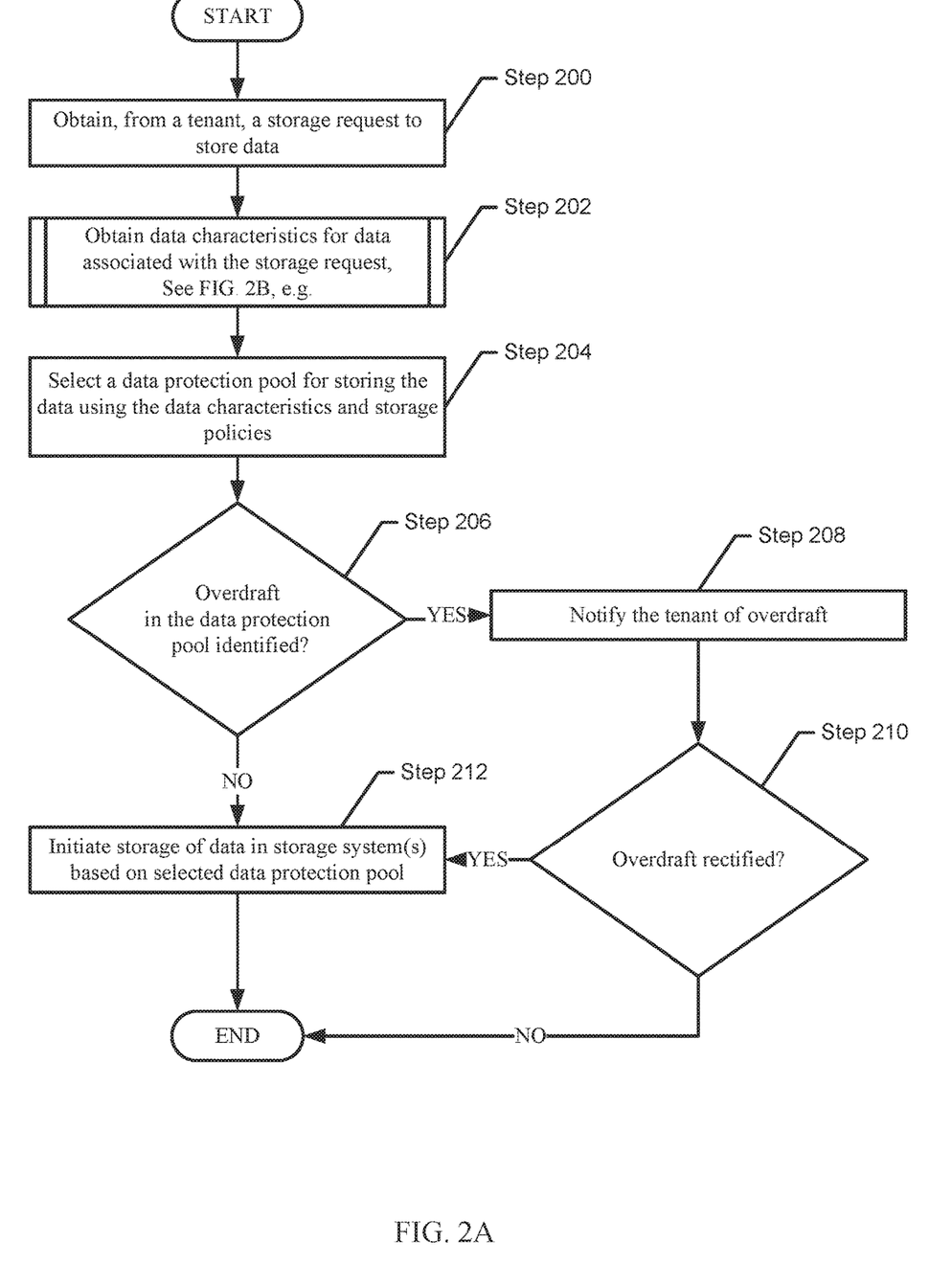
FIG. 2A shows a flowchart of a method for storing tenant data in a data protection pool in accordance with one or more embodiments of the invention.
Figure 2B:
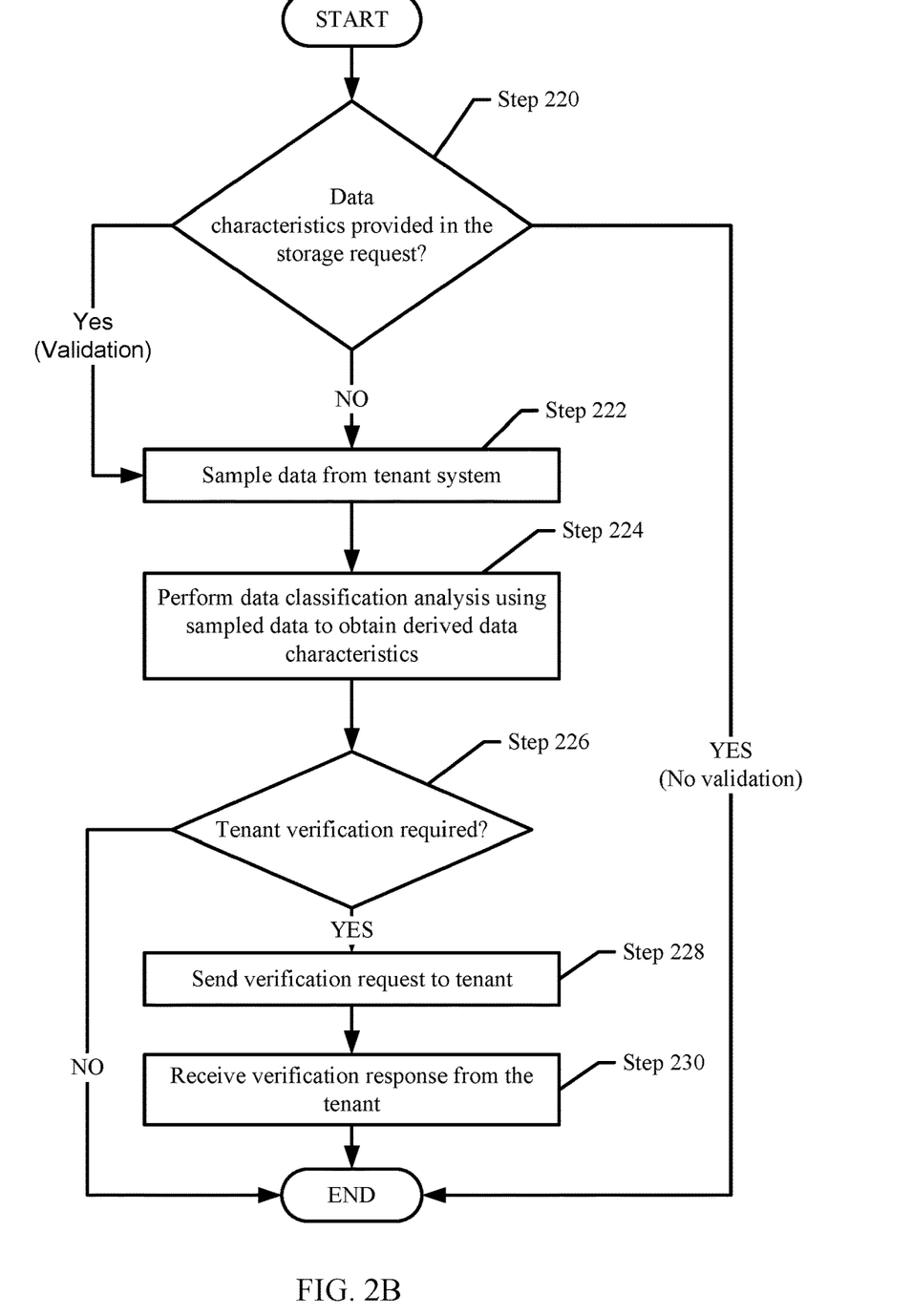
FIG. 2B shows a flowchart of a method for obtaining data characteristics in accordance with one or more embodiments of the invention.
Figure 2C:
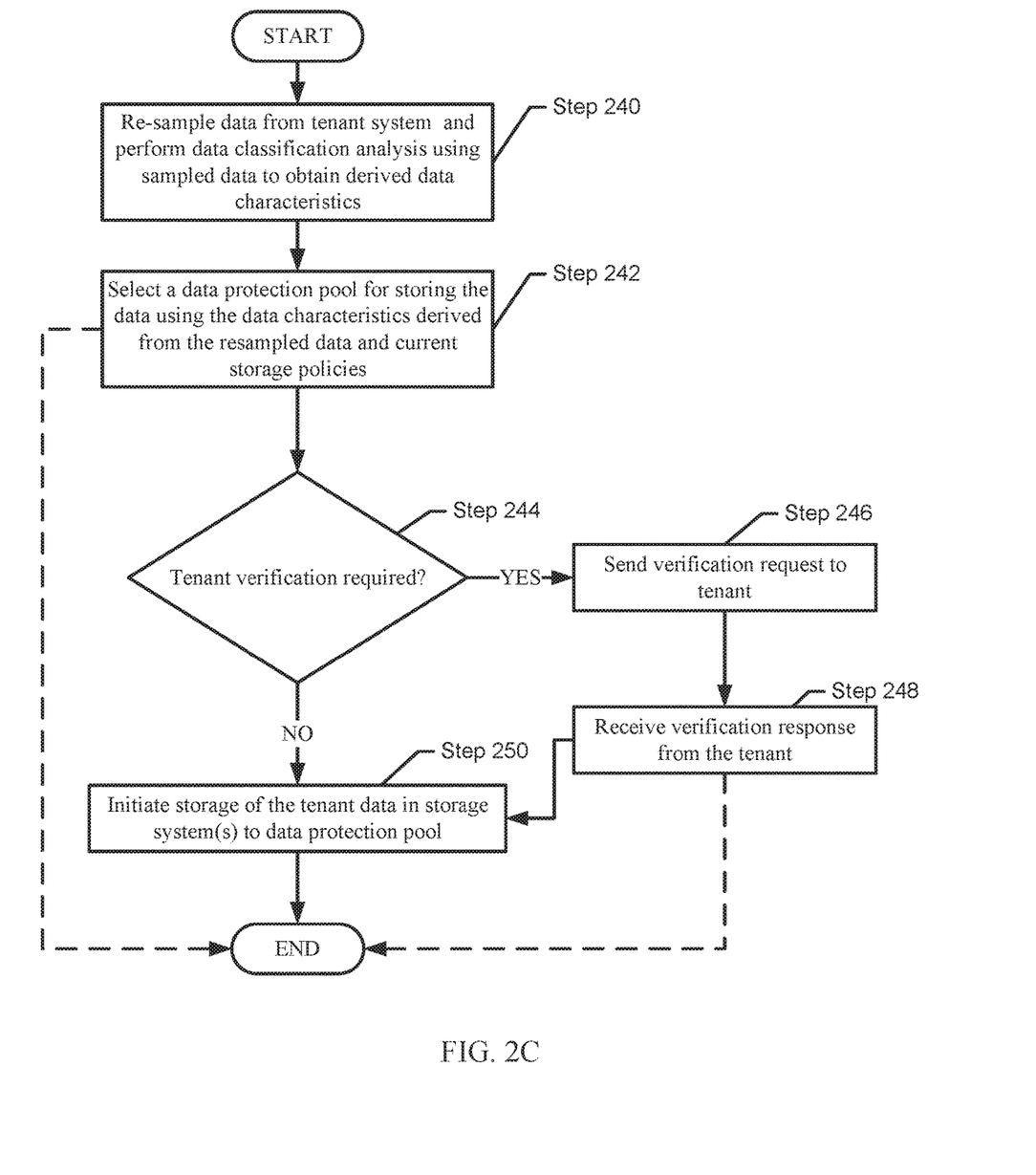
FIG. 2C shows a flowchart of a method for managing data protection pools in accordance with one or more embodiments of the invention.

In one or more of embodiments of the invention, the expert system analyzer (112) is implemented as computer instructions, e.g., computer code, stored on a persistent storage that, when executed by a processor of the data protection platform (110), causes the data protection platform (110) to provide the functionality of the expert system analyzer (112) described throughout the application, and/or all, or a portion thereof, of the methods illustrated in FIGS. 2A-2C.

The persistent storage (114) may be a physical or virtual device. For example, the persistent storage (114) may include solid state drives, solid state drives, tape drives, and other components to provide data storage functionality. Alternatively, the persistent storage (114) may be a virtual device that utilizes the physical computing resources of other components to provide data storage functionality.

In one or more embodiments of the invention, the persistent storage is implemented as an object storage device. The object storage device may utilize the computing resources of any number of computing devices and thereby provide the functionality of the persistent storage (114) such as, for example, as a public cloud storage system accessible via a wired or wireless connection.

In one or more embodiments of the invention, the persistent storage (114) is a storage device (physical or virtual) that stores data structures. The data structures may include storage policies (114A) and training data (114B). The persistent storage (114) may include additional, fewer, and/or otherwise different data structures. Each component of the persistent storage (114) is discussed below.

In one or more embodiments of the invention, the storage policies (114A) are a data structure(s) that includes policies for how to store data in the storage systems (120). The storage policies (114A) may specify a data protection pool in which to store the data according to data characteristics (which may also be referred to as content entity tags) of the data. For example, the storage policies (114A) may specify that data that includes sensitive information (e.g., credit card numbers, social security numbers, etc.) should be placed in a data protection pool that includes data encryption-at-rest. Other examples of storage policies may include: (i) placing pre-compressed data, such as, for example, video media, in a data protection pool that does not attempt to apply data reduction methods (e.g., compression or deduplication) on the data, (ii) placing data requiring high-performance service level agreement (SLA) in a highly responsive and available data protection pool (such as a flash backed or purpose built system such as Data Domain), and (iii) placing data requiring low performance SLA in a lower performing data protection pool (such as general purpose storage systems, network-attached storage (NAS) servers, or lower-cost object storage).

In one or more embodiments of the invention, the training data (114B) includes representative data (which may be obtained via sampling, see e.g., FIG. 2B, 222) and associated content entity tags (or data characteristics). Data characteristics may include any information related to the data such as file format, content-type, compression algorithm, data location, data sensitivity, etc. For example, the representative data may be various formats of credit card data and the content entity tag may be "CC DATA" or "SENSITIVE DATA". More specifically, the training data (114B) may be used to train one or more data classification models, which may be used by the expert system analyzer to label and classify data (See e.g., FIG. 2B).

Figure 4:
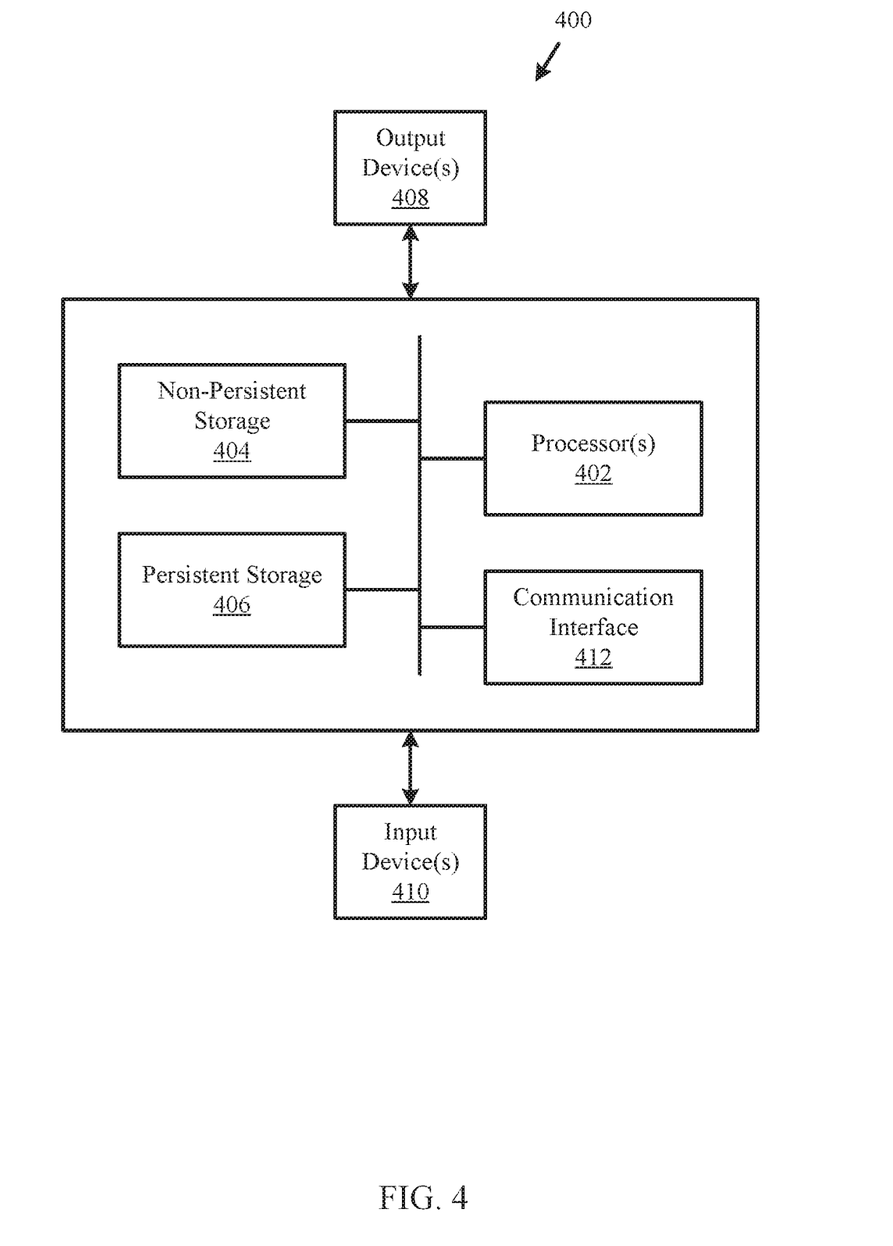
FIG. 4 shows a diagram of a computing device in accordance with one or more embodiments of the invention.

In one or more embodiments of the invention, the data protection platform (110) is implemented as a computing device (see e.g., FIG. 4). The computing device may be, for example, a mobile phone, a tablet, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data protection platform (110) (e.g., the functionality discussed above) described throughout this application and/or all, or a portion thereof, of the methods illustrated in FIGS. 2A-2C.

In one or more embodiments of the invention, the data protection platform (110) is implemented as a logical device. The logical device may utilize the computing resources of any number of computing devices and thereby provide the functionality of the data protection platform (110) described throughout this application and/or all, or a portion thereof, of the methods illustrated in FIGS. 2A-2C.

In one or more embodiments of the invention, the storage systems (120) store data for one or more tenants. The data may be, for example, tenant data (122A). The tenant data (122A) may be data generated by, or otherwise associated with, one or more tenant systems (100). The tenant data may be backup data (i.e., a copy of data stored in a tenant system). The storage systems (120) may obtain the tenant data (122A) from the data protection platform (110) and/or the tenant system(s) (100). The storage systems (120) may store additional data without departing from the invention.

In one or more embodiments of the invention, each of the storage systems (122, 124) is associated with a data protection pool and may store data in a manner that is required by the data protection pool. A data protection pool may include one or more storage systems (122, 124) to store the tenant data (122A). Each data protection pool may be configured to store the tenant data (122A) according to service level objectives (SLOs). An SLO may be an attribute of a data protection pool that meets a requirement for storing the data. For example, an SLO may specify that the data protection pool provide high availability of tenant data (122A) to a tenant system (100) associated with the tenant data (122A). In another example, the SLO may specify a minimum network bandwidth for the data protection pool. Additional examples may include the SLO specifying a minimum input/output per second (IOPS) for the data protection pool, a maximum cost per GB for the data protection pool, and/or other attributes without departing from the invention. The data protection pool may utilize computing resources of the storage systems (122, 124) to provide the storage of tenant data (122A) in accordance with the SLOs associated with the data protection pool.

In one or more embodiments of the invention, the storage systems (120) are implemented as a computing device (see e.g., FIG. 4). The computing device may be, for example, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to behave like the storage systems (120) as described throughout this application (e.g., as discussed above).

In one or more embodiments of the invention, the storage systems (120) are implemented as a logical device. The logical device may utilize the computing resources of any number of computing devices and thereby provide the functionality of the storage systems (120) described throughout this application.

Figure 1B:
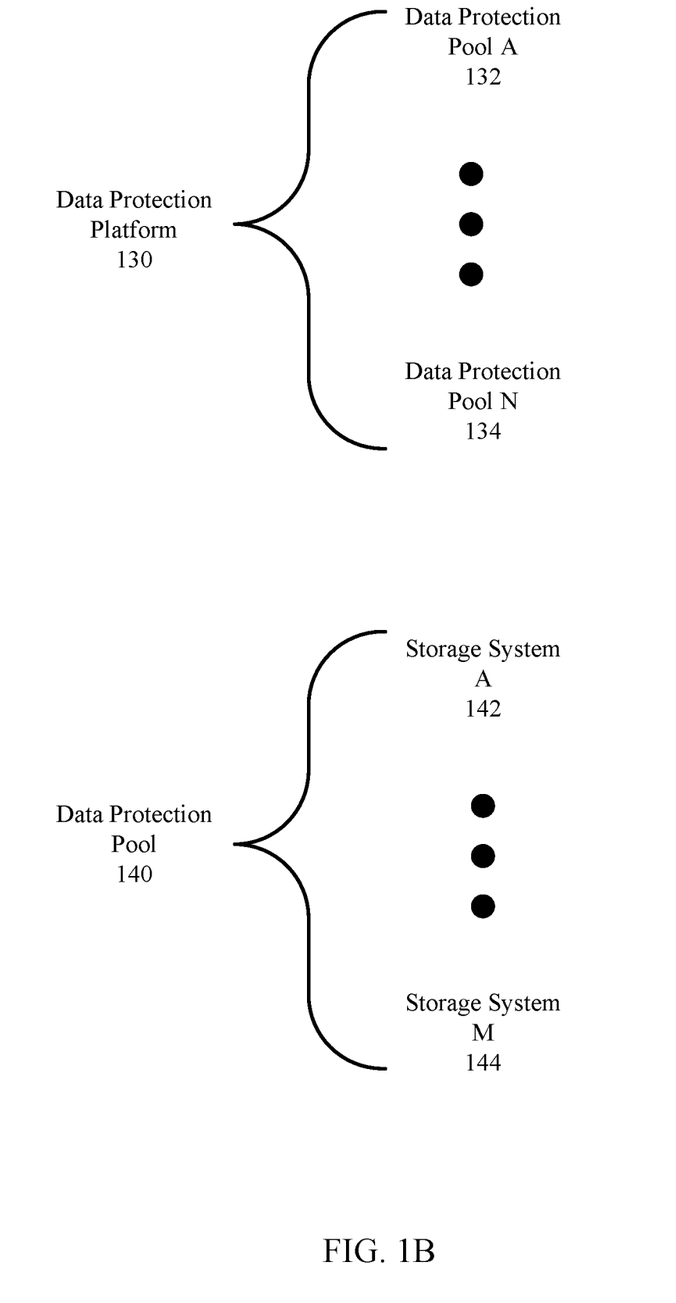
FIG. 1B shows a diagram of relationships between a data protection platform, data protection pools, and storage systems in accordance with one or more embodiments of the invention.

To clarify aspects of the invention, FIG. 1B shows relationships between various components in the system such as a data protection platform, data protection pools, and storage systems. Turning to FIG. 1B, each data protection platform (130) is associated with one or more data protection pools (132, 134). Each data protection pool is a logical entity that is associated with a set of data protection pool characteristics. The data protection pool characteristics may be grouped in to four groups, namely, performance, availability, reliability and security. In one embodiment of the invention, the "performance" characteristic may quantify the type of service level agreement (SLA) (e.g., very high, high, moderate, low, etc.), how long it takes to access the first byte of data, the rate at which data can be streamed during a restoration event, and/or the sustainable IOPS available to access the data. The expert system analyzer (112) may have the ability to track, monitor and manage the movement of data between different data protection pools as the data SLA changes over time (e.g., the SLA of a data protection pool can become less restrictive for long-lived data over time and the system is capable of monitoring for this and adjusts for this change). In one embodiment of the invention, the "availability" characteristic may quantify what type of storage system availability is implemented, e.g., highly available, not available, active, and standby. In one embodiment of the invention, the "reliability" characteristic specifies how the data is replicated and/or protected, (e.g., mirroring, Redundant Array of Independent Disks (RAID) implementation, etc.), how often the data is verified, and the depth of verification applied. In one embodiment of the invention, the "security" characteristic may quantify the type of security controls applied to the data including, for example, encryption-at-rest algorithms with various key lengths, encryption key rotation schemes and data immutability controls, etc. The data protection pools may have additional of different data protection pool characteristics without departing from the invention.

Continuing with the discussion of FIG. 1B, the data protection pools (132, 134), which are logical entities, provide a layer of abstraction with respect to the underlying storage systems (142, 144). More specifically, each data protection pool is associated with one or more storage systems (142, 144). For any given data protection pool, the associated storage systems will have characteristics that satisfy the data protection pool characteristics. However, the storage systems within a given data pool do not need to be the same. Said another way, the data protection pool may include a heterogeneous set of storage systems, all of which satisfy the data protection pool characteristics of the data protection pool.

In one embodiment of the invention, the steps shown in FIGS. 2A-2C may be performed in parallel with any other steps shown in FIGS. 2A-2C without departing from the scope of the invention. The methods shown in FIG. 2A-2C may be performed by, for example, a data protection platform (110, FIG. 1).

FIG. 2A shows a flowchart for storing tenant data in a data protection pool in accordance with one or more embodiments of the invention.

Turning to FIG. 2A, in Step 200, a storage request to store data is obtained by the data protection platform. In one or more embodiments of the invention, the storage request is issued, for example, by a tenant requesting to store tenant data (e.g., a copy of the tenant data as a backup) in a data protection pool and/or storage system(s).

In Step 202, data characteristics for the data associated with the storage request are obtained. In one embodiment of the invention, the data characteristics are provided in the storage request. In another embodiment of the invention, the data characteristics are determined (or derived) by the data protection platform. A method for deriving the data characteristics is provided in FIG. 2B. The data characteristics may be obtained via other methods without departing from the invention.

In Step 204, a data protection pool for storing the tenant data is selected using the data characteristics (which may include or be derived data characteristics) and the storage policies.

In one or more embodiments of the invention, the data protection pool is selected by comparing the data characteristics with storage policies in order to determine one or more data protection pools that may be used to store the data. Said another way, depending on the data characteristics of the data and the data characteristics specified in each of the storage policies, multiple storage policies may match the data characteristics. If only one data protection pool is identified, then this data protection pool is used to store the data. However, if multiple data protection pools are identified, then: (i) the data protection pool that has the lowest implementation and/or operational cost is selected, (ii) a request is sent to a user associated with the tenant to select one of the multiple data protection pools, (iii) the data protection pool with the lowest utilization is selected, (iv) the data protection pool with similar data is selected, (v) the data protection pool that already stores the tenant's data is used; or (vi) any other compatible mechanism/method may be used to select one of the data protection pools. In one embodiment of the invention, after a given data protection pool is selected, the data protection platform selects one or more storage systems in the data protection pool to store the data.

In Step 206, a determination is made about whether an overdraft in the data protection pool is identified. In one or more embodiments of the invention, an overdraft is a scenario in which the amount of data that the tenant is attempting to store (i.e., the tenant is requesting to store via the storage request) exceeds an amount of storage currently licensed by the tenant. In one embodiment of the invention, the determination in Step 206 includes: (i) determining one or more storage systems in the data protection pool in which the data is to be stored; (ii) for each of the identified storage systems in (i), determining how much data is to be stored in the storage system; and (iii) based on (ii), determining whether the amount of data to be stored will exceed the amount of storage that has been allocated, purchased, provisioned, or otherwise licensed by the tenant on a per storage system basis. If the amount of data to be stored will exceed the amount of storage that has been allocated, purchased, provisioned, or otherwise licensed by the tenant, then the data protection platform determines the presence of an overdraft and the process proceeds to Step 208; otherwise, the process proceeds to step 212.

In Step 208, the tenant is notified of the overdraft. More specifically, a user associated with the tenant may receive an electronic communication (e.g., an e-mail, or any other form of digital communication) indicating the presence of an overdraft and options for purchasing an appropriate license(s) or for performing another transaction in order to rectify the potential overdraft. The user may then take appropriate steps to purchase an appropriate license(s) or perform another transaction in order to rectify the potential overdraft. The aforementioned transactions may be performed between the user associated with the tenant system and a third-party computing device. The results of such transactions may be communicated to the data protection platform via any wired or wireless communication mechanism.

In Step 210, a determination is made about whether the overdraft has been rectified. This determination may be made using information received from the tenant system and/or from a third-party computing device (discussed above). If the overdraft has been rectified, the process proceeds to step 212; otherwise, the process ends.

In Step 212, the data protection platform initiates storage of data in storage system(s) identified in step 204. In one or more embodiments of the invention, the data protection platform manages the transfer of data from the tenant systems to the selected storage systems. In this scenario, the tenant system is only aware that the data is being stored in a given data protection pool, but the tenant system is not aware of the specific storage systems on which its data is stored. By only providing the tenant system with visibility for the data protection pool, the data protection platform may: (i) store the data from the tenant across multiple storage systems within the data protection pool, and (ii) provide the tenant system with a single unified global namespace. The single global namespace may provide the tenant system with a single view of all of its data in the data protection pool even though the data is physically stored across multiple storage systems.

In one embodiment of the invention, if the overdraft is not rectified, then the storage request may fail. Said another way, the data may be not stored in any data protection pool.

FIG. 2B shows a flowchart for obtaining data characteristics in accordance with one or more embodiments of the invention. In Step 220, a determination is made about whether data characteristics are provided in the storage request. If data characteristics are provided in the storage request, then the method ends following Step 220 if there is no validation of the data characteristics or the method may proceed to step 222 for validation of the data characteristics provided in the storage request. If data characteristics are not provided in the storage request, the method proceeds to Step 222.

In one embodiment of the invention, even though the data characteristics are specified in the storage request, the data protection platform may take steps to validate the data characteristics. This validation may be used to confirm that the data characteristics included in the storage request are representative of the actual data characteristics of the data. Said another way, a user of the tenant system may believe that the data to be stored has certain data characteristics; however, the user may be incorrect in their assumptions. In these scenarios, if the data characteristics are not validated, then the data protection pool may be determined or selected using incorrect data characteristics, which may result in an improper (or suboptimal) selection of the data protection pool.

In Step 222, the data protection system samples data from the tenant system. More specifically, in one embodiment of the invention, the expert system analyzer may sample (randomly or otherwise) data on the tenant system that is associated with the storage request. The sampling may include using a plugin or application programming interface (API) that enables the data protection platform to either: (i) request data samples from the tenant systems and/or (ii) to directly sample the data in the tenant systems. The amount of data that is sampled from the tenant systems may vary based on the implementation of the invention.

In Step 224, a data classification analysis is performed on sampled data to obtain derived data characteristics. More specifically, in one embodiment of the invention, the sampled data (i.e., the data obtained in step 222) is then processed (e.g., parsed) in order to divide (or segment that data) into portions, the individual portions or groups of portions are then classified using pattern matching rules and/or pattern matching models. The pattern matching rules correspond to user-provided rules that specify a given pattern and a corresponding data characteristic. For example, if the parsed data includes numbers in the following pattern: XXX-XX-XXXX, then the data characteristic may be "SSN" or "SENSITIVE".

The pattern matching models correspond to machine learning models, which are able to take the processed sampled data as input and determine an appropriate classification. Each pattern matching model may be trained using training data (114B, FIG. 1), which includes user-provided data and a corresponding data characteristic. The expert system analyzer may include multiple pattern matching models, where each pattern matching model may be specific to a particular data characteristic. Alternatively, or additionally, the expert system analyzer may include pattern matching models that are used to identify multiple data characteristics associated with the data.

In Step 226, a determination is made about whether tenant verification is required. In one embodiment of the invention, the tenant may specify (either in the storage request or via another mechanism or method) that it needs to verify the data characteristics (e.g., determine whether they are correct, accurate, and/or acceptable to the tenant) that were determined by the data protection platform. If tenant verification is required, then the method proceeds to step 228; otherwise, the method ends following Step 226.

In Step 228, a verification request is sent to the tenant associated with the storage request. The verification request may correspond to any electronic or digital communication to tenant (or, more specifically, to a user associated with the tenant). The verification request may identify the data and the data characteristics determined by the data protection platform.

In Step 230, a verification response is received from the tenant. In one or more embodiments of the invention, the verification response specifies that the data characteristics are representative of the data. In such embodiments, the samples of the data (i.e., the samples obtained in step 222) and the corresponding data characteristics may be added to the training data.

In one embodiment of the invention, the verification response may specify that the tenant does not approve of the data characteristics determined by the data protection platform. In such scenarios, the tenant may include, in the verification response, modifications to the data characteristics determined by the data protection platform.

FIG. 2C shows a flowchart for managing data protection pools in accordance with one or more embodiments of the invention. After data from a tenant system has been stored in a data protection pool, e.g., in accordance with the methods shown in FIGS. 2A-2B, the data characteristics may change. In order to ensure that the data is stored in the appropriate data protection pool, the data protection system may periodically re-sample the tenant data to determine whether the data is stored currently stored in an appropriate data protection pool or if the data needs to be migrated to a different data protection pool.

Turning to FIG. 2C, in Step 240, data for a tenant in a data protection pool is sampled and/or corresponding data in the tenant system is resampled. The sampling and/or re-sampling may be performed in a manner similar to the sampling in Step 222 (FIG. 2B). The data (obtained from the sampling or re-sampling) may be processed and subsequently analyzed in order to determine its data characteristics. The aforementioned analysis may be performed in a manner similar to Step 224 (FIG. 2B).

In Step 242, a data protection pool for storing the tenant data is selected using the data characteristics (which may include, or be, derived data characteristics) and the storage policies (i.e., the storage policies that are current stored in the data protection platform, which may be different than the storage policies that were present in the data protection platform in step 204). The processing in Step 242 may be performed in a manner consistent with Step 204. If the data protection pool that is selected in Step 242 corresponds to the data protection pool in which the data is currently stored, then there is no need to migrate the data and the process ends.

In Step 244, a determination is made about whether tenant verification is required. In one embodiment of the invention, the tenant may specify (either in the storage request or via another mechanism or method) that it needs to verify any proposed migration between data protection pools. If tenant verification is required, then the process proceeds to Step 246; otherwise, the process proceeds to Step 250.

In Step 246, a verification request is sent to the tenant associated with the storage request. The verification request may correspond to any electronic or digital communication to the tenant (or, more specifically, a user associated with the tenant) The verification request may identify the data, the data characteristics determined by the data protection platform, and the new data protection pool (i.e., the data protection pool determined in step 242).

In Step 248, a verification response is received from the tenant. In one or more embodiments of the invention, the verification response: (i) confirms that the migration to the new data protection pool is permitted, (ii) confirms that the migration to a different data protection pool, which is specified in the verification response, is permitted, or (iii) confirms that migration is not permitted If migration is not permitted, then the process ends. However, if migration is permitted, then in Step 250, the data protection platform initiates the migration of the data from the current data protection pool to another data protection pool (i.e., the new data protection pool identified by the data protection platform or the new data protection pool specified by the user). In this manner, the migration may be performed in a manner that requires little or no input from the tenant.

EXAMPLE

Figure 3A:
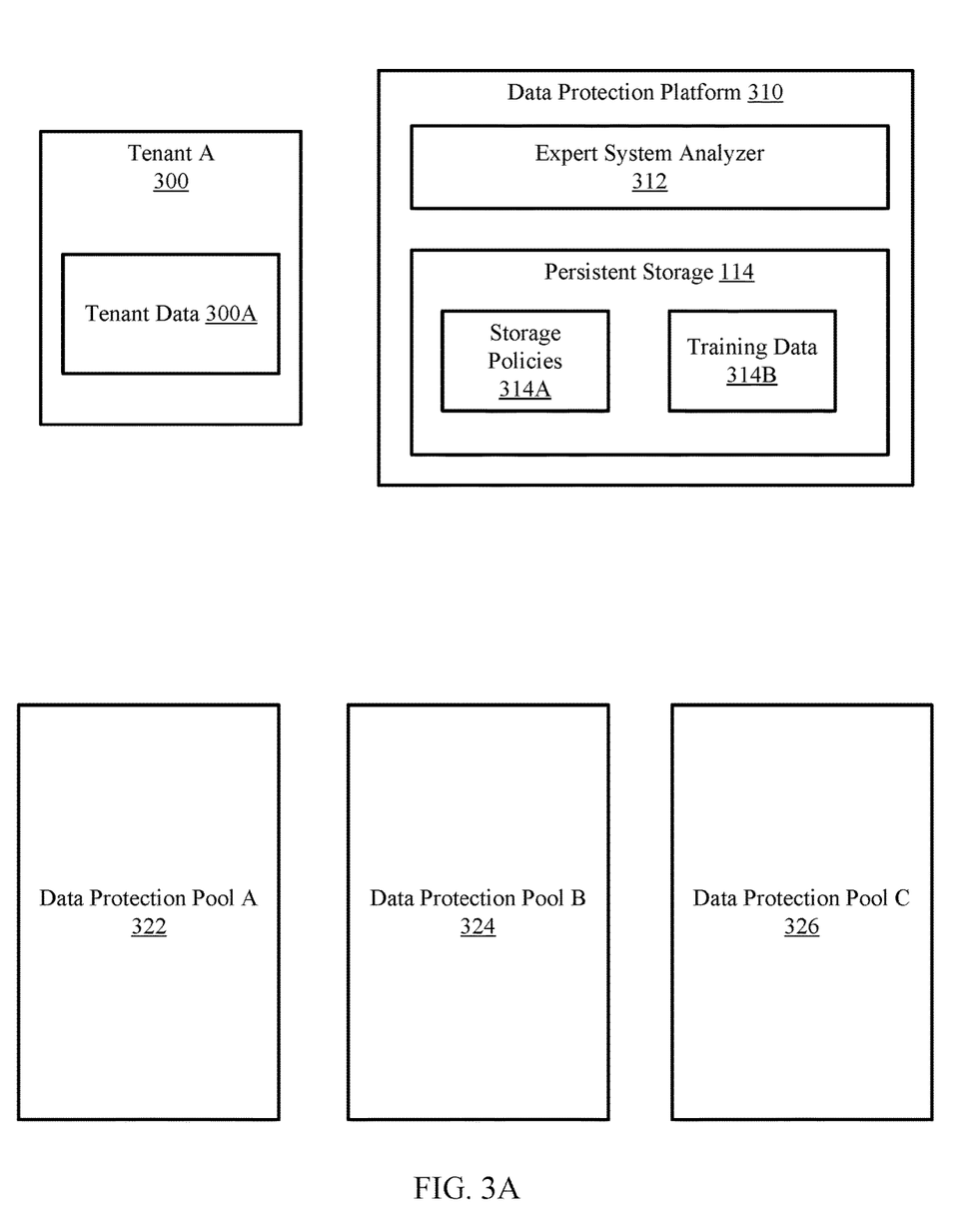
FIGS. 3A-3C show a diagram of example systems, each including a tenant system, a data protection platform, and a plurality of data protection pools in accordance with one or more embodiments of the invention.
Figure 3B:
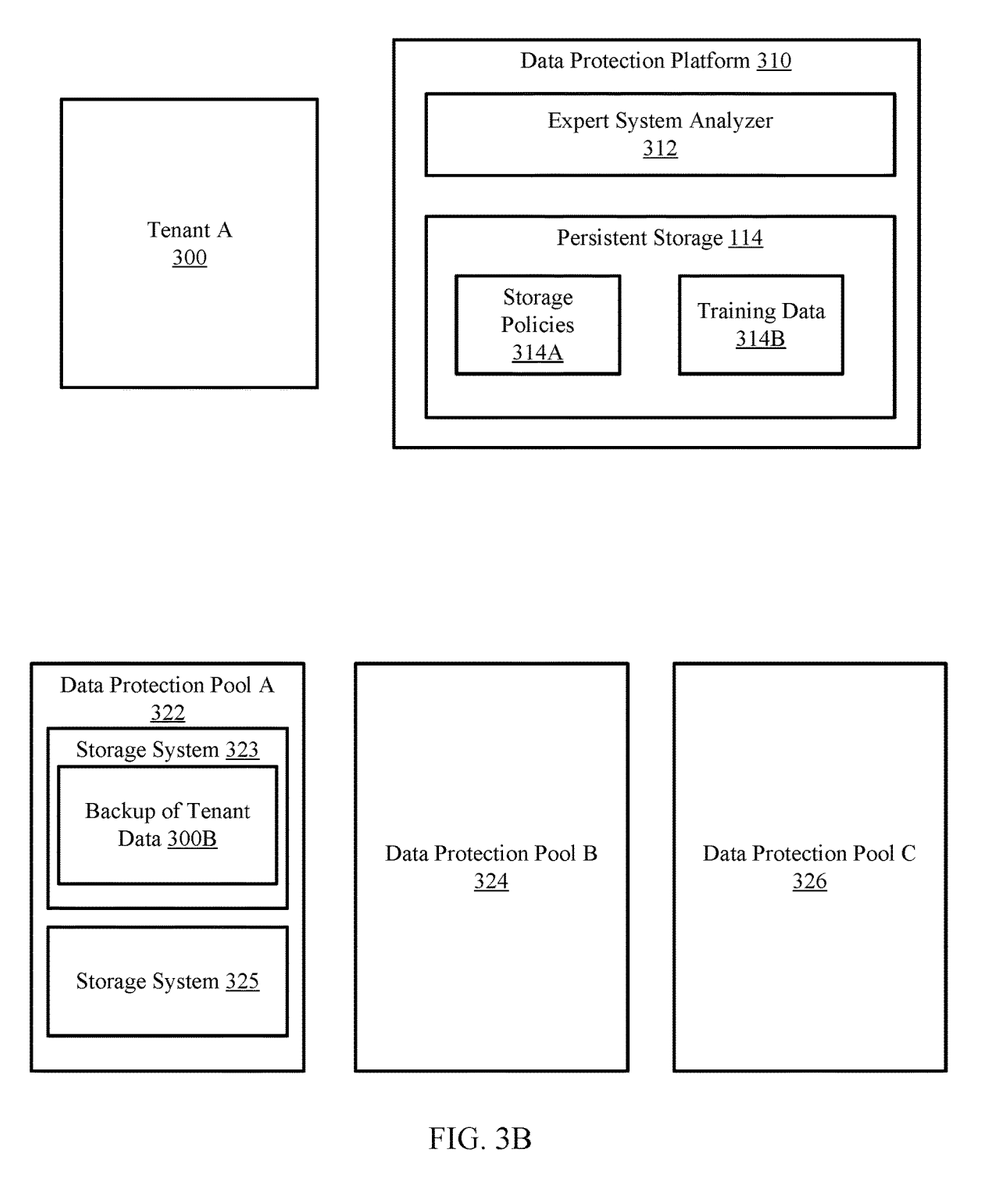
Figure 3C:
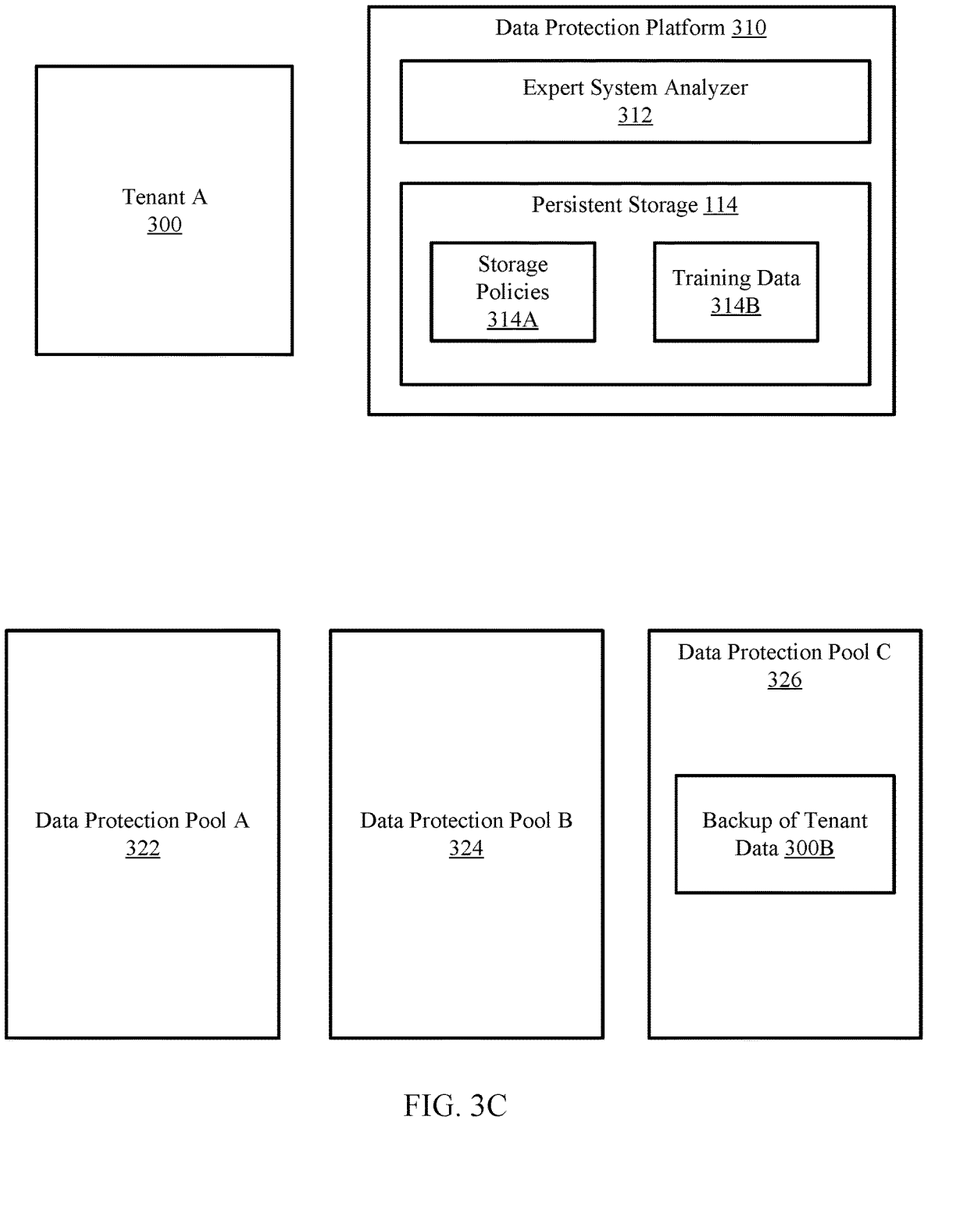

FIGS. 3A-3C illustrate example systems including a tenant system, a data protection platform, and multiple data protection pools. The following section describes an example system. The example is not intended to limit the invention. Turning to FIGS. 3A-3C, consider a scenario in which a tenant system (300) (FIG. 3A) has issued a storage request to store tenant data (300A) in a data protection pool. The tenant system (300) may send the storage request to a data protection platform (310). The data protection platform (310) may perform the methods of FIGS. 2A-2B to determine a data protection pool in which to store the tenant (300A) and initiate the storage of the tenant data (300A).

Specifically, the data protection platform may obtain data characteristics of the tenant data (300A) by sampling data from the tenant data (300A) using plugins provided by the tenant system (300). The data protection platform (310) may perform a data classification analysis using the sampled data to derive data characteristics. In this example, the data protection platform (310) determines that tenant data includes account information, such as account numbers and purchase information. The data protection platform (310) determines that data characteristics of the tenant data (300A) include "ACCOUNT NUMBERS" and "PURCHASES."

The data protection platform (310) subsequently identifies two storage policies that specify the derived data characteristics. In this example, the data protection platform determines that data protection pool (DPP) A (322) and DPP C (326) are possible options in which to store the tenant data. DPP A (322) and DPP C (326) both provide high security for the respective tenant data. However, DPP C (326) is associated with a high cost to license. The data protection platform, recognizing the higher monetary cost of DPP C (326), selects DPP A (322) as the data protection pool in which to store the tenant data (300A). The tenant system (300) subsequently receives a notification of the data protection platform's selection and sends a response that specifies approval of the selection. The data protection platform subsequently selects a storage system (FIG. 3B, 323) from the two storage systems (FIG. 3B, 323, 325) that are associated with data protection pool A (322), and then initiates the storage of a copy of the tenant data on the selected storage system (FIG. 3B, 323).

FIG. 3B illustrates the backup of the tenant data (300B) stored on a storage system (323) in the data protection pool (322). At a later point in time, the data protection pool (310) obtains re-sampled tenant data (not shown in FIG. 3B) and performs a data classification analysis on the re-sampled tenant data. In this example, after the initial selection of the data protection pool (322), the tenant system (300) provided an updated storage policy (not shown in FIG. 3B). Because the storage policies (314A) have been modified after the tenant data (300A) was first stored, the data protection platform (310) now determines, using the data characteristics associated with the re-sampled data, that the backup of the tenant data (300B) should be stored in DPP C (226). The tenant (300) receives a request to migrate (or relocate) the backup of the tenant data (300B) and approves of the re-location. FIG. 3C illustrates the backup of the tenant data (300B) stored in DPP C (326) after the tenant system (300) has approved the request.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., BLUETOOTH interface, infrared interface, network interface, optical interface, etc.), input device(s) (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may be utilized to improve the operation of one or more computing devices. More specifically, embodiments of the invention may be utilized to improve the efficiency of storing data by determining data characteristics of the data and identifying storage systems that satisfy the storage criteria in which to store the data. Because of the nature of the storage systems storing data, there may be a trade-off between how the data is stored. For example, some storage systems may provide high reliability for storing data, but at the cost of increasing the time it takes to access the data. Embodiments of the invention be utilized to automate the identification of data characteristics of data to be stored and then determine an optimal data protection pool in which to store data. In this manner, embodiments of the invention may be utilized to minimize user involvement in making a selection of a data protection pool in which to store the user's data, thereby improving the efficiency of storing and managing backup copies of tenant data.

Further, embodiments of the invention may be utilized to improve the efficiency of storing data by monitoring data stored in the data protection pools and using machine learning to re-classify the data and move the data to a more optimal data protection pool based on the reclassification. Embodiments of the invention may be utilized to use machine learning to train and improve the classification models to improve the selection of a data protection pool.

Thus, embodiments of the invention may be utilized to address the problem of inefficient use of computing resources in a distributed computing environment. This problem arises due to the technological nature of the environment in which backup services are implemented.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those of ordinary skill in the art, having the benefit of this disclosure, will appreciate that other embodiments can be devised which do not depart from the scope of the invention as disclosed herein. Accordingly, the scope of the invention should be limited only by the attached claims.

The invention claimed is:

1. A method for managing data, the method comprising:
   obtaining a storage request, from a tenant system of a tenant, to store data; and
   in response to the storage request from the tenant system:
      identifying a first data protection pool based on a data classification analysis performed on the data,
         wherein the data protection pool is associated with a set of data characteristics of the data,
         wherein the data characteristics are determined based on the data classification analysis;
      making, after the identifying, a determination that the first data protection pool will be in overdraft if the data is stored in the first data protection pool, wherein the first data protection pool will be in overdraft when an amount of the data that the tenant system is attempting to store in the first data protection pool exceeds an amount of storage in the first data protection pool that is licensed by the tenant;
      sending a notification to the tenant based on the determination;
      receiving, from the tenant system in response to the notification, information indicating that the overdraft is rectified; and
      based on the information, initiating storage of the data in a first storage system associated with the first data protection pool.

2. The method of claim 1, further comprising:
   identifying, in response to a second storage request, the first data protection pool based on a second data classification analysis performed on data associated with the storage request; and
   initiating storage of the data associated with the second storage request in a second storage system associated with the first data protection pool.

3. The method of claim 1, further comprising:
   performing a second data classification analysis on the data associated with the storage request, after storage of the data associated with the storage request in the first storage system, to identify a second data protection pool; and
   initiating storage of the data associated with the storage request in a second storage system associated with the second data protection pool.

4. The method of claim 3, further comprising:
   prior to initiating the storage of the data associated with the storage request in the second storage system:
      receiving a verification response from a tenant, wherein the verification response authorizes the storage of the data associated with the storage request in the second storage system.

5. The method of claim 3, wherein the first storage system is a local storage system and the second storage system is a cloud storage system.

6. The method of claim 1, wherein identifying the first data protection pool based on the data classification analysis comprises using a pattern matching model and sampled data from the tenant system to identify at least one data characteristic of the data associated with the storage request.

7. The method of claim 6, further comprising:
   obtaining at least a portion of the set of data characteristics using a plugin to the tenant system on which the data associated with the storage request is stored.

8. The method of claim 6, wherein at least one of the set of data characteristics comprise data type and data sensitivity.

9. A system, comprising:
   a processor; and
   memory storing instructions which, when executed by the processor, cause the processor to perform operations comprising:
      obtaining a storage request, from a tenant, to store data; and
      in response to the storage request:
         identifying a first data protection pool based on a data classification analysis performed on the data,
            wherein the data protection pool is associated with a set of data characteristics of the data,
            wherein the data characteristics are determined based on the data classification analysis;
         making, after the identifying, a determination that the first data protection pool will be in overdraft if the data is stored in the first data protection pool, wherein the first data protection pool will be in overdraft when an amount of the data that the tenant system is attempting to store in the first data protection pool exceeds an amount of storage in the first data protection pool that is licensed by the tenant;
         sending a notification to the tenant based on the determination;
         receiving, from the tenant system in response to the notification, information indicating that the overdraft is rectified; and
         based on the information, initiating storage of the data in a first storage system associated with the first data protection pool.

10. The system of claim 9, the operations performed by the processor when the instructions are executed further comprising:
   performing a second data classification analysis on the data associated with the storage request, after storage of the data associated with the storage request in the first storage system, to identify a second data protection pool; and
   initiating storage of the data associated with the storage request in a second storage system associated with the second data protection pool.

11. The system of claim 10, the operations performed by the processor when the instructions are executed further comprising:
   prior to initiating the storage of the data associated with the storage request in the second storage system:

receiving a verification response from a tenant, wherein the verification response authorizes the storage of the data associated with the storage request in the second storage system.

12. The system of claim 10, wherein the first storage system is a local storage system and the second storage system is a cloud storage system.

13. A non-transitory computer readable medium storing computer readable program code, which when executed by a computer processor causes the computer processor to perform operations comprising:
   obtaining a storage request, from a tenant, to store data; and
   in response to the storage request:
      identifying a first data protection pool based on a data classification analysis performed on the data,
         wherein the data protection pool is associated with a set of data characteristics of the data,
         wherein the data characteristics are determined based on the data classification analysis;
      making, after the identifying, a determination that the first data protection pool will be in overdraft if the data is stored in the first data protection pool, wherein the first data protection pool will be in overdraft when an amount of the data that the tenant system is attempting to store in the first data protection pool exceeds an amount of storage in the first data protection pool that is licensed by the tenant;
      sending a notification to the tenant based on the determination;
      receiving, from the tenant system in response to the notification, information indicating that the overdraft is rectified; and
      based on the information, initiating storage of the data in a first storage system associated with the first data protection pool.

14. The non-transitory computer readable medium of claim 13, the operations performed by the computer processor when the program code is executed further comprising:
   identifying, in response to a second storage request, the first data protection pool based on a second data classification analysis performed on data associated with the storage request; and
   initiating storage of the data associated with the second request in a second storage system associated with the first data protection pool.

15. The non-transitory computer readable medium of claim 13, the operations performed by the computer processor when the program code is executed further comprising:
   performing a second data classification analysis on the data associated with the storage request, after storage of the data associated with the storage request in the first storage system, to identify a second data protection pool; and
   initiating storage of the data associated with the storage request in a second storage system associated with the second data protection pool.

16. The non-transitory computer readable medium of claim 15, the operations performed by the computer processor when the program code is executed further comprising:
   prior to initiating the storage of the data associated with the storage request in the second storage system:
      receiving a verification response from a tenant, wherein the verification response authorizes the storage of the data associated with the storage request in the second storage system.

17. The non-transitory computer readable medium of claim 15, wherein the first storage system is a local storage system and the second storage system is a cloud storage system.

18. The non-transitory computer readable medium of claim 13, wherein identifying the first data protection pool based on the data classification analysis comprises using a pattern matching model and sampled data from the tenant system to identify at least one data characteristic of the data associated with the storage request.

19. The non-transitory computer readable medium of claim 18, the operations performed by the computer processor when the program code is executed further comprising:
   obtaining at least a portion of the set of data characteristics using a plugin to a tenant system on which the data associated with the storage request is stored.

20. The non-transitory computer readable medium of claim 18, wherein at least one of the set of data characteristics comprise data type, data retention, data sensitivity, and data location.

* * * * *